(12) United States Patent
Ikeda et al.

(10) Patent No.: US 8,780,301 B2
(45) Date of Patent: Jul. 15, 2014

(54) LIQUID CRYSTAL DISPLAY DEVICE

(75) Inventors: Kojiro Ikeda, Kanagawa (JP); Tomoaki Sekime, Tottori (JP); Toshinori Uehara, Tottori (JP); Keiji Takizawa, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 206 days.

(21) Appl. No.: 13/269,248

(22) Filed: Oct. 7, 2011

(65) Prior Publication Data

US 2013/0088666 A1 Apr. 11, 2013

(51) Int. Cl.
*G02F 1/01* (2006.01)
(52) U.S. Cl.
USPC ............................................. 349/96; 349/95
(58) Field of Classification Search
USPC ........................................... 349/96, 95
See application file for complete search history.

(56) References Cited

U.S. PATENT DOCUMENTS

| | | | |
|---|---|---|---|
| 6,028,651 A * | 2/2000 | Abileah et al. ................ 349/123 |
| 6,115,095 A | 9/2000 | Suzuki et al. | |
| 6,184,957 B1 | 2/2001 | Mori et al. | |
| 6,219,122 B1 * | 4/2001 | Uchida et al. ................ 349/117 |
| 6,285,430 B1 * | 9/2001 | Saito ............................. 349/141 |
| 6,359,671 B1 * | 3/2002 | Abileah ........................ 349/119 |
| 6,437,843 B1 * | 8/2002 | Van De Witte et al. ....... 349/117 |
| 6,519,013 B1 * | 2/2003 | Nagai et al. ..................... 349/33 |
| 6,912,029 B2 * | 6/2005 | Tanaka .......................... 349/118 |
| 7,088,411 B2 * | 8/2006 | Allen et al. .................... 349/121 |
| 7,201,955 B2 * | 4/2007 | Mac Master .................. 428/212 |
| 7,301,594 B2 * | 11/2007 | Yu et al. ........................ 349/120 |
| 7,336,330 B2 * | 2/2008 | Tanaka .......................... 349/118 |
| 7,522,238 B2 * | 4/2009 | Matsuoka ..................... 349/117 |
| 7,623,208 B2 * | 11/2009 | Lee et al. ....................... 349/119 |
| 2004/0066482 A1 * | 4/2004 | Tanaka .......................... 349/141 |
| 2005/0110933 A1 * | 5/2005 | Jeon et al. ..................... 349/141 |
| 2005/0112343 A1 * | 5/2005 | MacMaster ................... 428/212 |
| 2005/0129918 A1 * | 6/2005 | Mac Master .................. 428/212 |

(Continued)

FOREIGN PATENT DOCUMENTS

| | | |
|---|---|---|
| JP | 3118208 | 10/2000 |
| JP | 3204182 | 6/2001 |

(Continued)

OTHER PUBLICATIONS

Japanese Office Action issued Dec. 10, 2013 in corresponding Japanese Patent Application No. 2009-182182.

*Primary Examiner* — Kaveh Kianni
(74) *Attorney, Agent, or Firm* — K&L Gates LLP

(57) ABSTRACT

A liquid crystal display device of a transverse electric field type has characteristics in the following respects. A liquid crystal layer is sandwiched between two substrates. Two polarizing plates are provided on a side of the two substrates opposite to the liquid crystal layer such that the light transmission axes thereof are orthogonal to each other. A first electrode and a second electrode are formed on one of the two substrates. The liquid crystal is driven by an electric field generated between the first electrode and the second electrode. The polarizing plate, formed on one of the two substrates, is formed of a protective film, a polarizer, and two negative biaxial films. The two negative biaxial films include first and second negative biaxial films. The first negative biaxial film and the second negative biaxial film are entirely overlapped, and are disposed on a side of one or the other substrate.

4 Claims, 12 Drawing Sheets

(56) References Cited

U.S. PATENT DOCUMENTS

| | | |
|---|---|---|
| 2005/0140900 A1* | 6/2005 | Jeon et al. .................... 349/141 |
| 2005/0219449 A1* | 10/2005 | Tanaka ......................... 349/119 |
| 2005/0243252 A1* | 11/2005 | Matsuoka .................... 349/117 |
| 2005/0248707 A1* | 11/2005 | Jeon et al. .................... 349/141 |
| 2006/0055854 A1* | 3/2006 | Yu et al. ....................... 349/117 |
| 2006/0114383 A1* | 6/2006 | Kobayashi et al. ........... 349/117 |
| 2006/0285051 A1* | 12/2006 | Jeon et al. .................... 349/141 |
| 2007/0064187 A1* | 3/2007 | Takeda et al. ................ 349/127 |
| 2007/0146585 A1* | 6/2007 | Ahn .............................. 349/106 |
| 2007/0222743 A1* | 9/2007 | Hirakata ....................... 345/102 |
| 2007/0229739 A1* | 10/2007 | Iwamoto ....................... 349/117 |
| 2007/0285599 A1* | 12/2007 | Oxude ............................ 349/99 |
| 2008/0079878 A1* | 4/2008 | Sugiyama et al. ............ 349/119 |
| 2008/0094326 A1* | 4/2008 | Yamaki et al. .................. 345/87 |
| 2009/0102989 A1* | 4/2009 | Sakai et al. ...................... 349/1 |
| 2009/0103012 A1* | 4/2009 | Itadani et al. ................... 349/96 |
| 2009/0115944 A1* | 5/2009 | Jeon et al. ....................... 349/96 |
| 2009/0161044 A1* | 6/2009 | Ge et al. ......................... 349/98 |
| 2010/0007822 A1* | 1/2010 | Itadani et al. ................... 349/96 |
| 2010/0177267 A1* | 7/2010 | Chang et al. .................... 349/96 |
| 2010/0309414 A1* | 12/2010 | Tomonaga et al. ............. 349/96 |

FOREIGN PATENT DOCUMENTS

| | | |
|---|---|---|
| JP | 2005-309386 | 11/2005 |
| JP | 2006-293108 | 10/2006 |
| JP | 4276392 | 3/2009 |

* cited by examiner nx > ny > nz nx > nz > ny

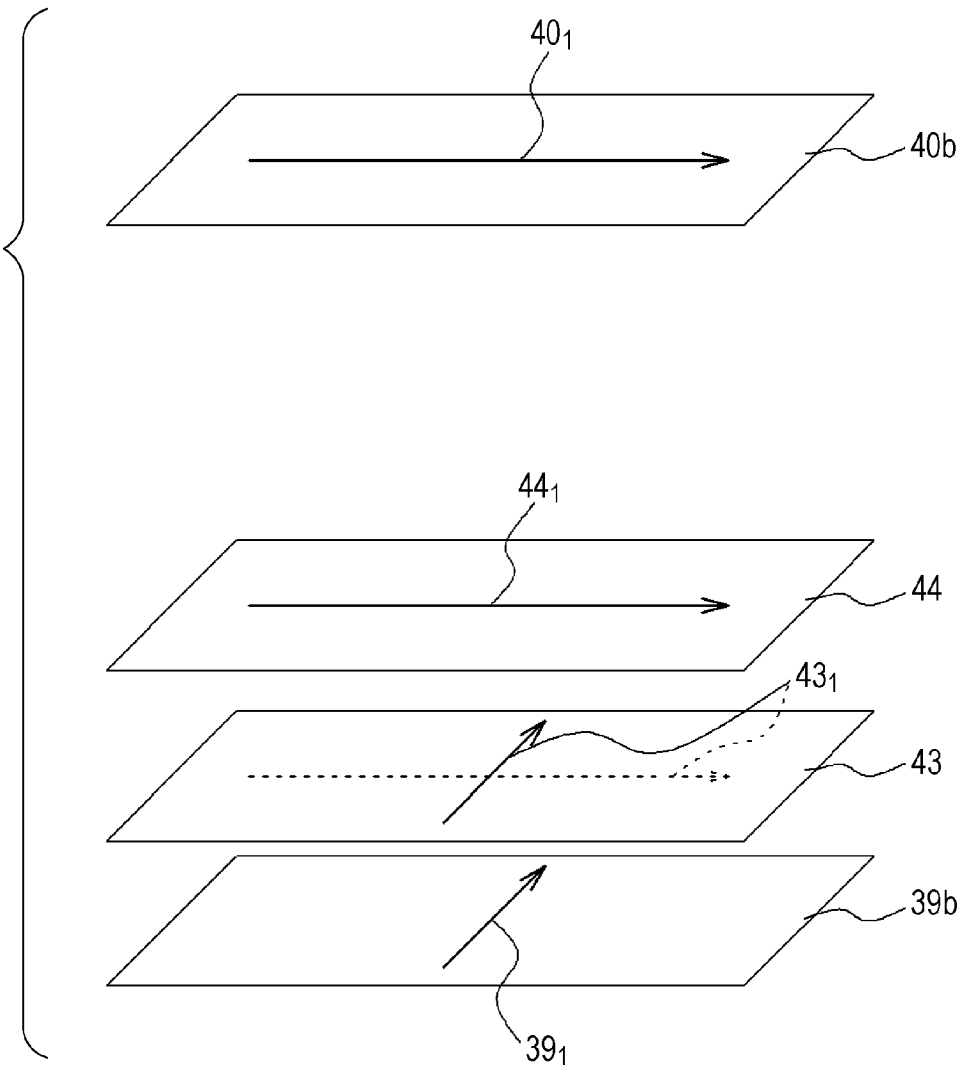

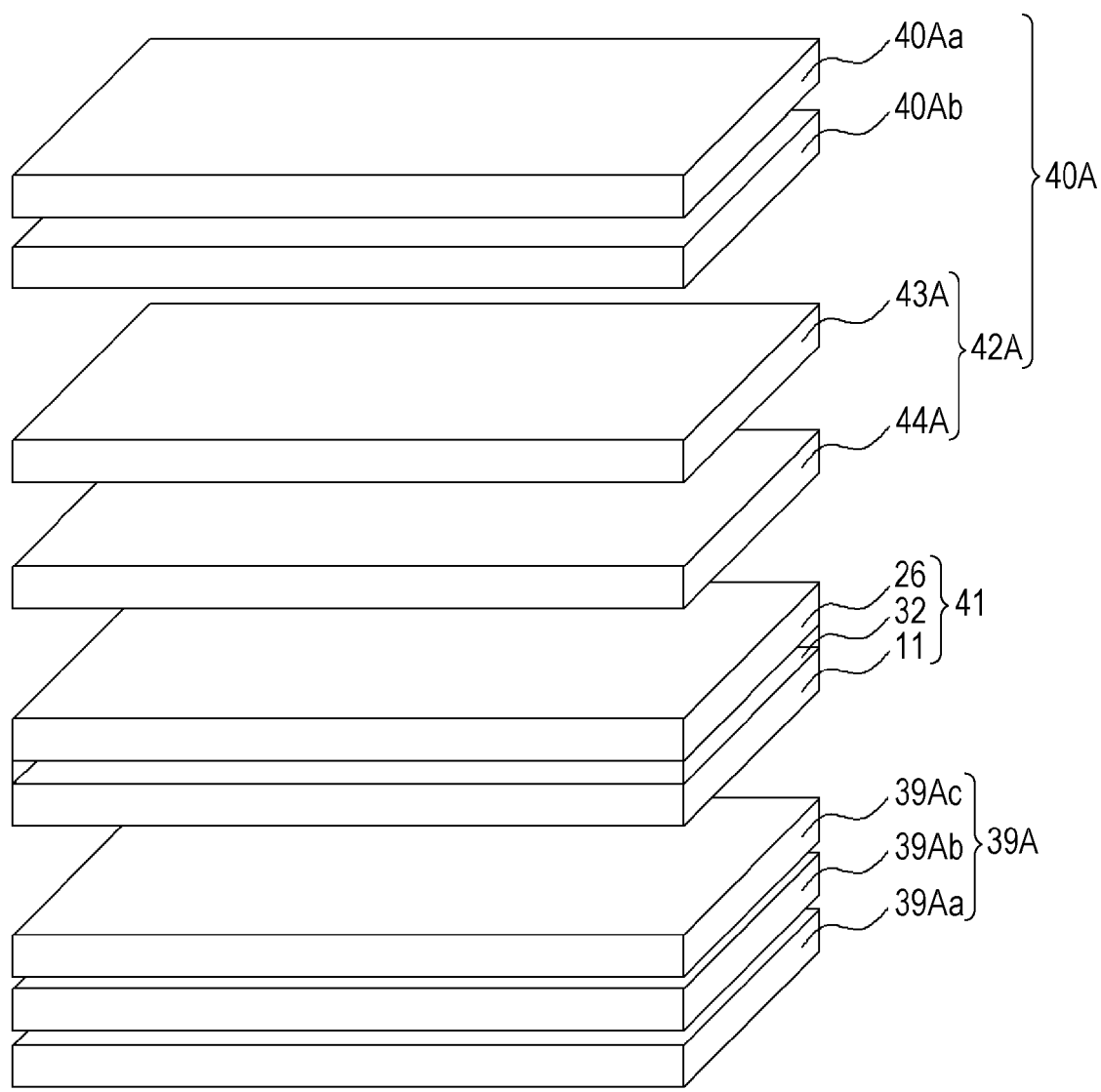

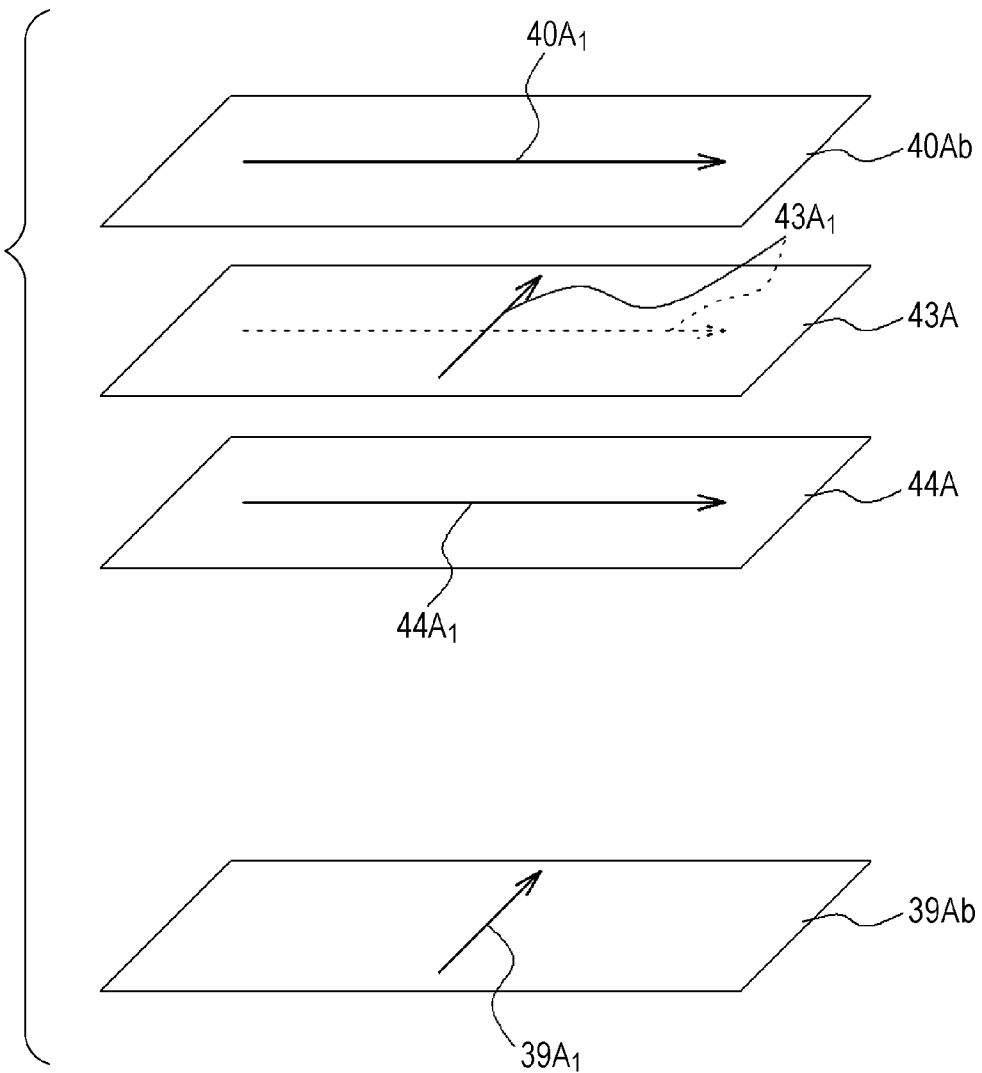

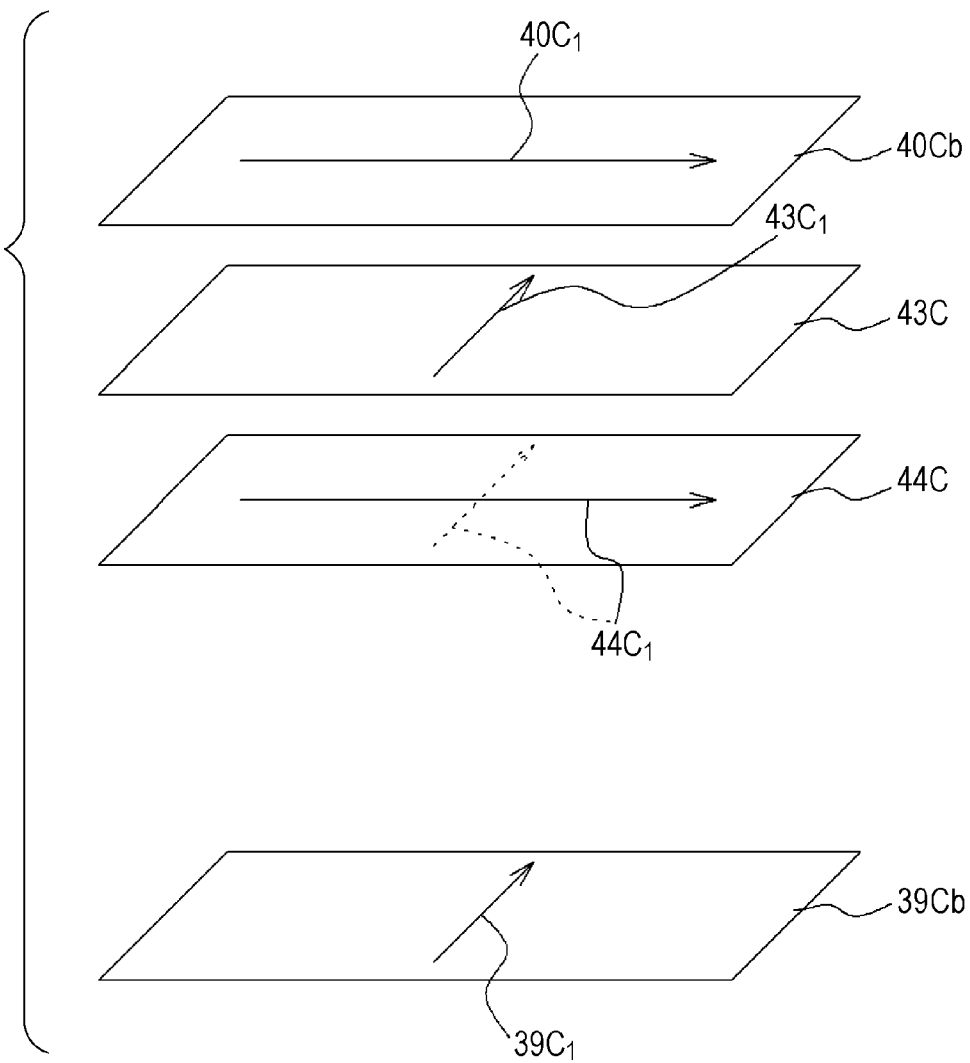

LIQUID CRYSTAL DISPLAY DEVICE

CROSS-REFERENCE TO RELATED APPLICATIONS

The present application is related to Japanese Patent Application No. 2009-182182 filed on Aug. 5, 2009, the disclosure of which is incorporated herein by reference.

BACKGROUND

The present disclosure relates to a transverse electric field type liquid crystal display device. Specifically, the disclosure relates to a transverse electric field type liquid crystal display device capable of achieving an increase in the angle of view by using two negative biaxial films as retardation plates.

Liquid crystal display devices have characteristics of a light weight, a small thickness, and low power consumption as compared with CRTs (Cathode-Ray Tube), and thus are used for display in many electronic apparatuses. The liquid crystal display device displays an image by changing a direction of liquid crystal molecules oriented in a prescribed direction through an electric field so as to change an amount of light transmitted through a liquid crystal layer. As a method of applying an electric field to the liquid crystal layer of the liquid crystal display device, there are methods using a vertical electric field type and a transverse electric field type. In the liquid crystal display device of the vertical electric field type, an electric field is applied to liquid crystal molecules in a substantially vertical direction by using a pair of electrodes which are disposed with a liquid crystal layer interposed therebetween. Examples of the known liquid crystal display device of the vertical electric field type include liquid crystal display devices of a TN (Twisted Nematic) mode, a VA (Vertical Alignment) mode, an MVA (Multi-domain Vertical Alignment) mode, and the like.

In the transverse electric field type liquid crystal display device, a pair of electrodes are disposed to be insulated from each other on the inner side of one substrate of a pair of substrates which are disposed with a liquid crystal layer interposed therebetween, and an electric field in the substantially vertical direction is applied to the liquid crystal molecules. Examples of the known transverse electric field type liquid crystal display device include liquid crystal display devices of an IPS (In-Plane Switching) mode, in which the pair of electrodes do not overlap each other in plan view, and a FFS (Fringe Field Switching) mode in which the pair of electrodes overlap each other. The transverse electric field type liquid crystal display devices have an effect of achieving a wide angle of view, and thus recently have come into widespread use.

The transverse electric field type liquid crystal display device uses liquid crystal, which is homogeneously aligned, and a pair of polarizing plates which are disposed with the liquid crystal layer interposed therebetween such that the transmission axes thereof are orthogonal to each other in vertical and horizontal directions with respect to a front side of a screen. In the transverse electric field type liquid crystal display device having such a configuration, as the screen is viewed at an angle from the left, right, top, or bottom, the two transmission axes have a positional relationship that those are orthogonal to each other, and thus it is possible to obtain a sufficient contrast. However, as the screen is viewed at an azimuthal angle of 45°, an angle formed between the transmission axes of the pair of polarizing plates is larger than 90°. Therefore, the transmitted light leaks due to birefringence thereof, and thus the contrast is lowered. Accordingly, there are problems such as a decrease in the angle of view caused by the deterioration in contrast.

As liquid crystal display devices for solving the problems of the transverse electric field type liquid crystal display devices, in the related art, there have been known liquid crystal display devices using various retardation plates and the like for the sake of increasing an angle of view or improving image quality. For example, Japanese Patent No. 3118208 discloses a liquid crystal display device that has an optical compensation sheet which has an optically negative uniaxiality. Further, Japanese Patent No. 3204182 discloses a liquid crystal display device that has two layers, each of which has a positive uniaxial optical anisotropy, as compensation layers for compensating a birefringent index of the liquid crystal layer.

Furthermore, PCT Japanese Translation Patent Publication No. 2006-520008 discloses a liquid crystal display device using a negative biaxial retardation film and a +C-plate as films for compensating the angle of view. In addition, Japanese Unexamined Patent Application Publication No. 2006-293108 discloses a liquid crystal display device using a negative uniaxial optical film, which has an optical axis in a plane thereof, and a second optical film (a negative biaxial optical film) of which the refractive index in a thickness direction is smaller than any direction in the plane thereof.

Further, Japanese Patent No. 4276392 discloses a liquid crystal display using a C-type or P-type wide-viewing-angle polarizing plate. Here, the C type is a wide-viewing-angle polarizing plate formed by overlapping, in an orthogonal manner, biaxial retardation films each of which has a birefringence characteristic that a phase difference in the plane of the polarizer is equal to 250 nm to 300 nm and Nz is equal to 0.1 to 0.4. The P type is a wide-viewing-angle polarizing plate formed by overlapping, in a parallel manner, the biaxial retardation films each of which has a birefringence characteristic that a phase difference in the plane of the polarizer is equal to 250 nm to 300 nm and Nz is equal to 0.6 to 1.1.

SUMMARY

As disclosed in Japanese Patent Nos. 3118208, 3204182, and 4276392, PCT Japanese Translation Patent Publication No. 2006-520008, and Japanese Unexamined Patent Application Publication No. 2006-293108, in order to achieve an increase in the angle of view of the liquid crystal display device, various retardation plates and the like are used. However, as the technology for liquid crystal display device has advanced remarkably, in order to increase an angle of view and improve image quality, there is a demand for new technology.

For this reason, the inventors and the like studied, in depth, a configuration which has a different structure from that of the related art and is capable of achieving an increase in the angle of view and improving image quality at least equivalent to or better than those of the transverse electric field type liquid crystal display devices in the related art. As a result, the inventors found the fact that it is possible to derive the configuration by using two negative biaxial films as retardation plates, and thus proposed the disclosure.

Consequently, in the disclosure, it is desirable to provide a transverse electric field type liquid crystal display device capable of achieving an increase in the angle of view and improving image quality at least equivalent to or better than those of the transverse electric field type liquid crystal display devices in the related art.

According to an embodiment of the disclosure, a liquid crystal display device includes a pair of substrates; a liquid crystal layer sandwiched between the pair of substrates; a pair of polarizing plates provided on a side of the pair of substrates opposite to the liquid crystal layer such that the light transmission axes thereof are orthogonal to each other; a first electrode; a second electrode, where the first electrode and the second electrode are formed on one substrate of the pair of substrates; the liquid crystal display device is a transverse electric field type liquid crystal display device in which the liquid crystal layer is driven by an electric field generated between the first electrode and the second electrode; one of the pair of the polarizing plate, which is formed on the one substrate of the pair of substrates, is formed of a protective film, a polarizer, and two negative biaxial films; the two negative biaxial films include a first negative biaxial film and a second negative biaxial film; and the first negative biaxial film and the second negative biaxial film are overlapped and disposed on a side of the one substrate or the other substrate.

According to the liquid crystal display device of the embodiment of the disclosure, the two negative biaxial films are provided as retardation plates. Therefore, it is possible to significantly improve the function of compensating an angle of view, and thus it is possible to achieve a wide angle of view which is at least equivalent to or better than that of the transverse electric field type liquid crystal display device in the related art. Further, the negative biaxial film is also able to function as a protective film of one of the polarizing plates. Hence, the protective film can be removed, and thus it is possible to reduce an increase in thickness of the polarizing plate caused by using the two negative biaxial films.

In the liquid crystal display device according to the embodiment of the disclosure, it is preferable that the first negative biaxial film should be disposed on a side of a polarizer of the polarizing plate, an optical axis of the second negative biaxial film should be set to be parallel with an initial orientation direction of the liquid crystal, and an optical axis of the first negative biaxial film should be set to be parallel with or be orthogonal to the initial orientation direction of the liquid crystal.

In the transverse electric field type liquid crystal display device, the pair of polarizing plates are disposed in a cross-Nicol arrangement relative to each other, whereby the light transmission axis of one of the pair of polarizing plates are disposed to be parallel with or orthogonal to the initial orientation direction of the liquid crystal. In addition, the initial orientation direction of the liquid crystal is determined by the rubbing direction of the alignment film which is formed on the liquid crystal layer side of the pair of substrates. Hence, in the liquid crystal display device according to the embodiment of the disclosure, in order for the viewing angle compensation film to have the function of compensating the angle of view, the two negative biaxial films are disposed between the liquid crystal display element and the polarizer of the polarizing plate. Here, it is necessary to make the optical axes of the two negative biaxial films orthogonal to or parallel with each other, and it is necessary to make the optical axes orthogonal to or parallel with the light transmission axis of the polarizer.

According to the liquid crystal display device of the embodiment of the disclosure, the first negative biaxial film is disposed on the side of the polarizer of the polarizing plate, the optical axis of the second negative biaxial film is set to be parallel with the initial orientation direction of the liquid crystal, and the optical axis of the first negative biaxial film is set to be parallel with or be orthogonal to the initial orientation direction of the liquid crystal. Hence, it is possible to effectively implement the function of compensating an angle of view.

Further, in the liquid crystal display device according to the embodiment of the disclosure, it is preferable that the second negative biaxial film should be disposed on a side of a polarizer of the polarizing plate, an optical axis of the second negative biaxial film should be set to be orthogonal to an initial orientation direction of the liquid crystal, and an optical axis of the first negative biaxial film should be set to be parallel with or be orthogonal to the initial orientation direction of the liquid crystal.

According to the liquid crystal display device of the embodiment of the disclosure, by adopting such a configuration, it is also possible to exhibit the same effect as the case described above.

Furthermore, in the liquid crystal display device according to the embodiment of the disclosure, it is preferable that the first negative biaxial film should satisfy a relationship of $nx>ny>nz$ (furthermore, $nx$, $ny$ and $nz$ represent refractive indices of the respective axis directions, and d represents a thickness of a retardation plate), an in-plane phase difference Ro thereof should be represented by $0 \text{ nm} < (nx-ny)*d \leq 20 \text{ nm}$, and a large-thickness-direction phase difference Rth thereof should be represented by $50 \text{ nm} \leq \{(nx+ny)/2-nz\}*d \leq 100 \text{ nm}$.

It is also preferable that the second negative biaxial film should satisfy a relationship of $nx>nz>ny$, an in-plane phase difference Ro thereof should be represented by $100 \text{ nm} \leq (nx-ny)*d \leq 200 \text{ nm}$, and a birefringence coefficient Nz thereof represented by $(nx-nz)/(nx-ny)$ should be in a range of $-0.3$ to $0.3$.

According to the liquid crystal display device of the embodiment of the disclosure, by using the above-mentioned numerical ranges, it is possible to implement a favorable function of compensating an angle of view within the visible light range.

In the liquid crystal display device according to the embodiment of the disclosure, it is preferable that both the first negative biaxial film and the second negative biaxial film should be formed of a stretched film such as triacetyl cellulose, polycarbonate, or polynorbornene.

The stretched film is a viewing angle compensation film which is widely used, is not a special material, and is easily obtainable. Hence, it is possible to manufacture a liquid crystal display layer having the above-mentioned effects with low costs.

Additional features and advantages are described herein, and will be apparent from the following Detailed Description and the figures.

BRIEF DESCRIPTION OF THE DRAWINGS

FIG. 6 is a schematic diagram illustrating an example of phases of respective layers according to embodiment 1;

FIG. 7 is an exploded perspective view illustrating the liquid crystal display device according to embodiment 2;

FIG. 8 is a schematic diagram illustrating an example of phases of respective layers according to embodiment 2;

FIG. 12 is a schematic diagram illustrating an example of phases of respective layers according to embodiment 4.

DETAILED DESCRIPTION

Figure 1:
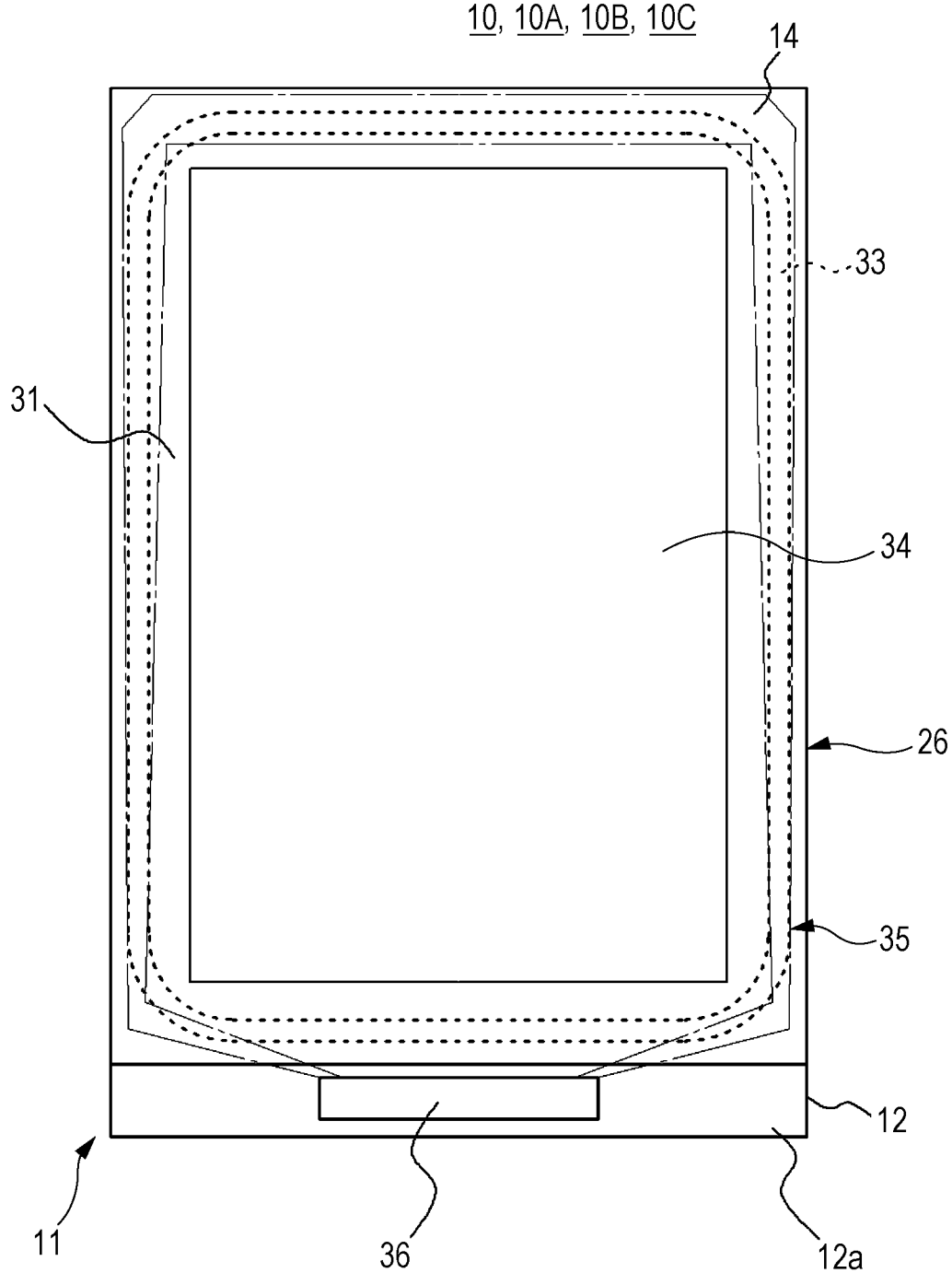
FIG. 1 is a top plan view of a liquid crystal display device which is common to embodiments 1 to 4.

The present disclosure will be described below according to an embodiment with reference to the accompanying drawings. The embodiments to be described later exemplify FFS-mode liquid crystal display devices in order to embody the technical idea of the disclosure. The disclosure is not to be considered to be limited to the FFS-mode liquid crystal display devices according to the embodiments, and the disclosure can be applied in the same manner to various applications other than those of the embodiments within the appended claims. Furthermore, the purpose of the accompanying drawings is to describe embodiments of the disclosure. Accordingly, in order to facilitate the understanding of the respective layers and members in the drawings, the scales indicated for the layers and members may be different from one another, and thus the dimensions thereof may not exactly reflect those in an actual situation.

Further, the "front surface" of the array substrate and the color filter substrate to be described later represents the surface, on which the various wires are formed, or the surface on the side which is opposed to the liquid crystal. In addition, the "back surface" thereof represents the display side surface (in the case of the color filter substrate) or the backlight side surface (in the case of the array substrate). Further, the transverse electric field type liquid crystal display device according to the embodiment of the disclosure can be applied to a liquid crystal display device which is manufactured by using a method of filling liquid crystal. However, hereinafter a liquid crystal display device, which is manufactured by using a method of dripping the liquid crystal (One Drop Fill which is hereinafter referred to as "ODF"), will be described as an example. Furthermore, the liquid crystal display device is manufactured by using a mother substrate, but for convenience of description, one FFS-mode liquid crystal display device will be described as a representative example.

Embodiment 1

First, the FFS-mode liquid crystal display device 10 according to embodiment 1 of the disclosure will be described with reference to FIGS. 1 to 3. The liquid crystal display device 10 according to embodiment 1 is, as shown in FIG. 1, a so-called COG (Chip On Glass) type liquid crystal display device, which includes an array substrate 11, a color filter substrate 26, and a seal material 33 for bonding both substrates 11 and 26, and in which the liquid crystal (refer to FIG. 3) is sealed in the area surrounded by the array substrate 11, the color filter substrate 26, and the seal material 33. In the liquid crystal display device 10, a display region 34 is formed in the inside area surrounded by the seal material 33, and an area, which is provided around the display region 34 and in which an image is not visible, is a non-display region 35 of the liquid crystal display device 10. Further, the liquid crystal display device 10 according to embodiment 1 is manufactured by the ODF method, and thus the opening for filling the liquid crystal. Then, a first polarizing plate 39 and a second polarizing plate 40 are respectively provided on the back surface of the color filter substrate 26 and the back surface of the array substrate 11 (refer to FIG. 3).

In the array substrate 11, various wires for driving the liquid crystal and the like are formed on the front surface of the first transparent substrate 12 which is formed of glass in a rectangular shape. The length of the array substrate 11 is larger than that of the color filter substrate 26 in the lengthwise direction, and thus an extended portion 12a is formed thereon so as to extend to the outside when both substrates 11 and 26 are bonded. An IC chip, which outputs driving signals, a driver 36, which is formed by LSI or the like, is provided on the extended portion 12a. In addition, a common wire 14 is formed to further extend from the driver 36.

Figure 2:
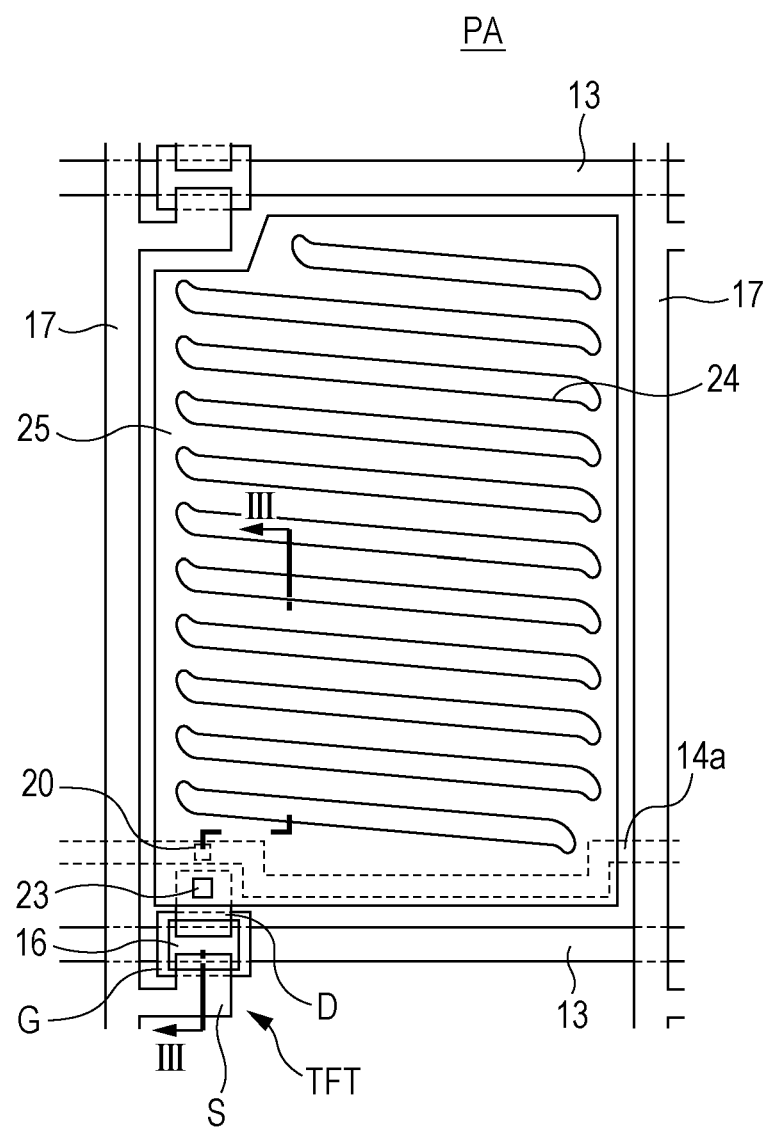
FIG. 2 is an enlarged top plan view of one pixel within a display region of FIG. 1.
Figure 3:
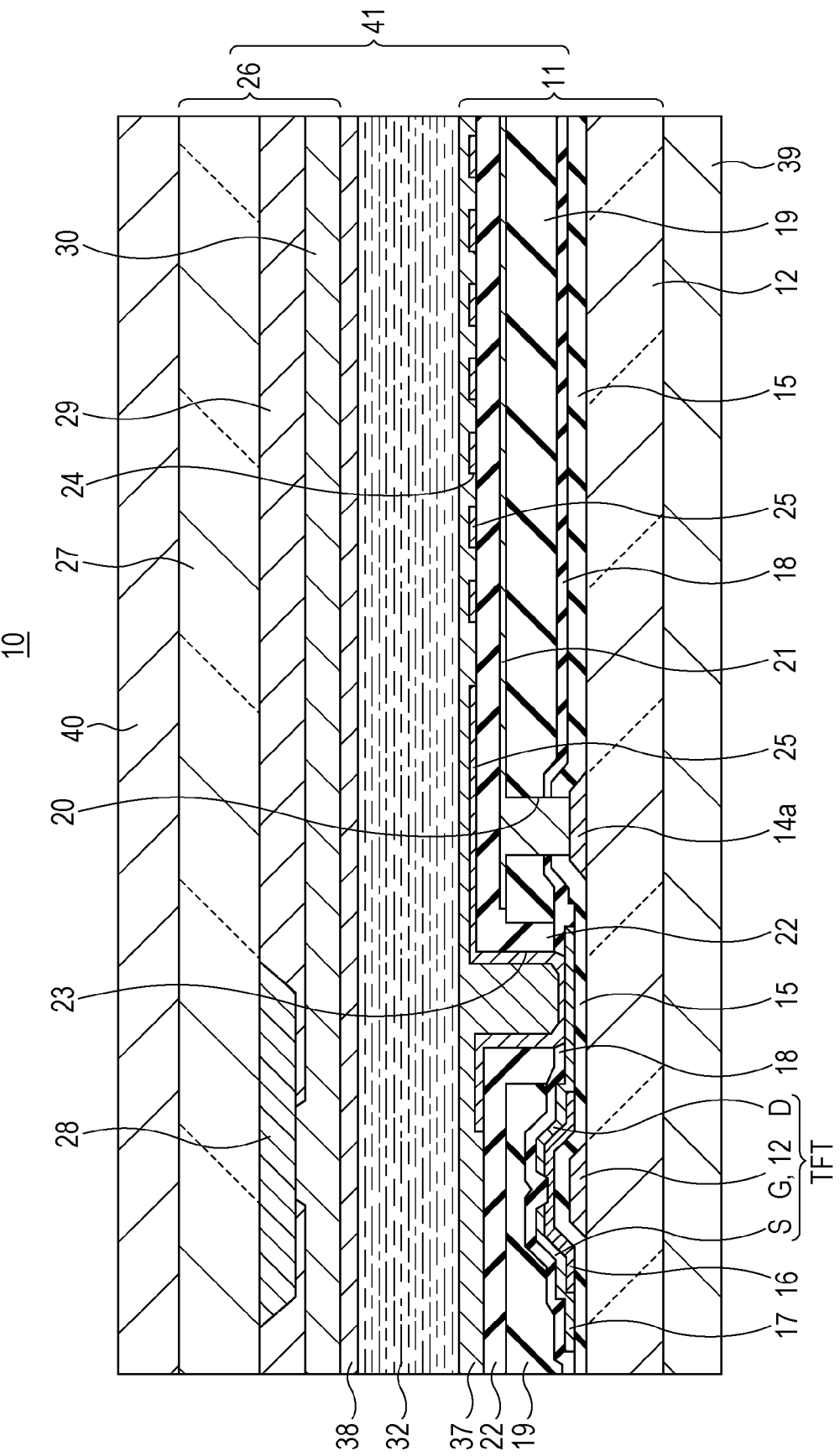
FIG. 3 is an enlarged sectional view taken along the III-III line of FIG. 2.

In the display region 34 of the array substrate 11, as shown in FIGS. 2 and 3, in addition to a plurality of scanning lines 13 and signal lines 17, a plurality of common wires 14a is provided to be parallel with the scanning lines 13 between the plurality of scanning line 13. Further, a gate insulation film 15, which is made of silicon oxide or silicon nitride, is provided to cover the scanning lines 13, the common wires 14a, and the exposed transparent substrate 12. In addition, thin film transistor TFTs as switching elements, each of which includes a source electrode S, a gate electrode G, a drain electrode D, and a semiconductor layer 16, are formed in the vicinities of the intersections between the scanning lines 13 and the signal lines 17.

Further, a passivation film 18 for stabilizing the front surface thereof is formed of an inorganic material such as silicon oxide or silicon nitride so as to cover those. In addition, an interlayer film 19 for planarizing the front surface of the array substrate 11 is formed of an organic insulation material.

Subsequently, through the photolithography method and the etching method, first contact holes 20 are formed to penetrate the gate insulation film 15 and the passivation film 18 on the common wires 14a. The first contact holes 20 may be formed by adopting a plasma etching method, which is one of the dry etching methods, or a wet etching method using buffer hydrofluoric acid. In such a manner, the common wires 14a are exposed.

Subsequently, a transparent conductive layer is formed of, for example, ITO or IZO so as to cover the entire front surface of the transparent substrate 12 on which the interlayer film 19 is formed. Then, a lower electrode 21 is formed on the front surface of the interlayer film 19 for each pixel through the photolithography method and the etching method. At this time, the lower electrode 21 of the each pixel is electrically connected to the common wire 14a through the first contact hole 20. Accordingly, the lower electrode 21 functions as a common electrode.

Further, an insulation film 22 is formed of a silicon nitride layer or a silicon oxide layer throughout the entire front surface of the first transparent substrate on which the lower electrodes 21 are formed. At this time, the insulation film 22 covers the front surface of the interlayer film 19 corresponding to parts in which the contact holes will be formed on the drain electrodes D. Subsequently, second contact holes 23 are formed, through the photolithography method and the etching method, on the interlayer film 19 and the insulation film 22 corresponding to the parts, in which the contact holes will be formed on the drain electrodes D.

Further, a transparent conductive layer is formed of, for example, ITO or IZO so as to cover the entire front surface of the first transparent substrate 12 on which the insulation film 22 is formed. Then, an upper electrode 25, on which a plurality of slits 24 is formed, is formed on the front surface of the insulation film 22 for each pixel through the photolithography method and the etching method. The upper electrode 25 is electrically connected to the drain electrode D of the thin film transistor TFT in the second contact hole 23, and thus functions as a pixel electrode. Thereafter, a first alignment film 37, which is formed of for example polyimide on the entire front surface including the upper electrodes 25 in the display region 34, is formed, and then the array substrate 11 of the liquid crystal display device 10 according to embodiment 1 is formed. Furthermore, the first alignment film 37 is subjected to a process (a rubbing process) of orienting the liquid crystal direction toward the direction intersecting with the direction in which each slit 24 extends. Further, each region, which is surrounded by the plurality of the scanning lines 13 and the signal lines 17, is formed as one sub-pixel region PA.

Further, in the color filter substrate 26, a light shielding film 28 made of a metal material is formed on the front surface of the second transparent substrate 27, which is made of glass, so as to cover the non-display region 35 and the positions corresponding to the scanning lines 13, the signal lines 17, and the thin film transistors TFT of the array substrate 11.

Further, color filter layers 29 of prescribed colors such as red (R), green (G), and blue (B) are formed on the front surface of the second transparent substrate 27 which is surrounded by the light shielding film 28 in the display region 34. In addition, an overcoat layer 30 is formed to cover the front surfaces of the light shielding film 28 and the color filter layer 29.

In addition, a second alignment film 38 is formed of, for example, polyimide so as to cover the overcoat layer 30, and then the color filter substrate 26 according to embodiment 1 is formed. The second alignment film 38 is subjected to the process of orienting the liquid crystal direction toward a direction opposite to the first alignment film 37 which is formed on the array substrate 11.

In addition, in the above-mentioned array substrate 11 and color filter substrate 26, for example, the display region 34 of the array substrate 11 is filled with the liquid crystal by dripping the liquid crystal, the non-display region 35 of the color filter substrate 26 is coated with the seal material formed of resin which can be cured by ultraviolet light, and then both substrates 11 and 26 are bonded. Thereafter, by irradiating the seal material 33 with ultraviolet light, the seal material 33 is cured, and the driver 36 is provided on the extended portion 12a of the array substrate 11. Further, columnar spacers (not shown in the drawing) for maintaining the cell gap between both substrates at a predetermined distance are formed between the color filter substrate 26 and the array substrate 11.

Thereafter, the first polarizing plate 39 and the second polarizing plate 40 are respectively provided on the back sides of both bonded substrates, and a backlight unit (not shown in the drawing) is disposed outside the first polarizing plate 39 on the side of the array substrate 11, thereby forming the FFS-mode liquid crystal display device 10 according to embodiment 1. Furthermore, the first polarizing plate 39 and the second polarizing plate 40 are disposed in a cross-Nicol arrangement, whereby one of the light transmission axes of the first polarizing plate 39 and the second polarizing plate 40 is disposed to be parallel with or orthogonal to the rubbing direction of the first alignment film 37 or the second alignment film 38, that is, the initial orientation direction of the liquid crystal.

Figure 4:
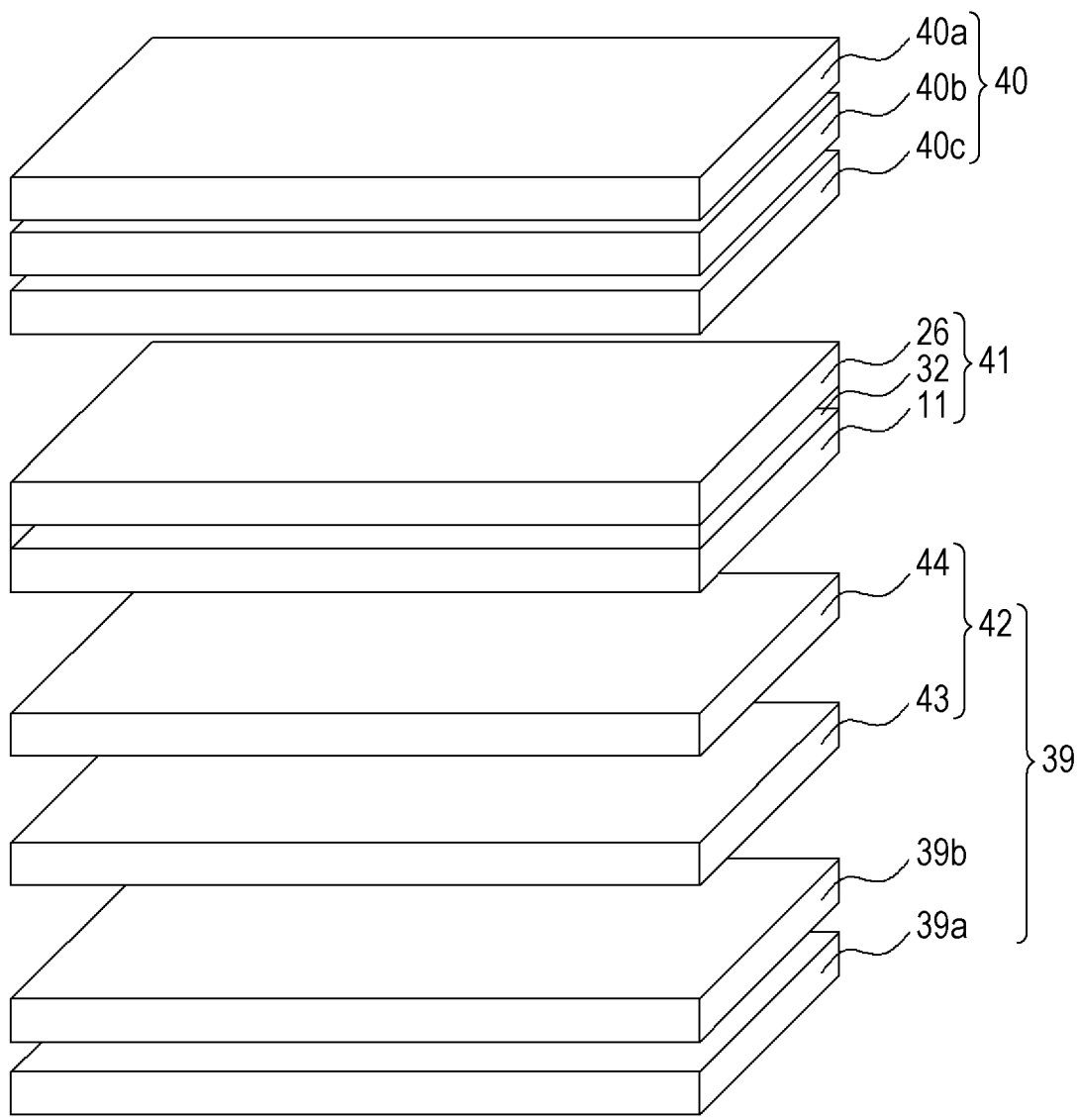
FIG. 4 is an exploded perspective view illustrating the liquid crystal display device according to embodiment 1.

Here, referring to FIG. 4, specific configurations of the first polarizing plate 39 and the second polarizing plate 40 will be described. Furthermore, for convenience of description, the array substrate 11 and the color filter substrate 26 sandwiching the liquid crystal layer 32 are collectively referred to as a liquid crystal display substrate 41. The polarizing plate normally used has a configuration in which protective films are disposed on both surfaces of the polarizer that can be obtained by uniaxially stretching a polyvinyl alcohol (PVA) film into which an iodine complex or a dichroic dye is absorbed. As the protective film, transparent triacetyl cellulose (TAC) has been widely used. In the liquid crystal display device 10 according to embodiment 1, as the second polarizing plate 40 which is disposed on one outer surface of the liquid crystal display substrate 41, similarly to the polarizing plate in the related art, protective films 40a and 40c, which are made of TAC and are attached to both surfaces of a polarizer 40b, are used.

However, as the first polarizing plate 39 which is disposed on the other outer surface of the liquid crystal display substrate 41, the protective film 39a made of TAC is used for the outer surface of a polarizer 39b, but two negative biaxial films 42 are used as the protective film on the side of the liquid crystal display substrate 41. Here, one of the two negative biaxial films 42 is provided as the first negative biaxial film 43, and the other is provided as a second negative biaxial film 44.

In the liquid crystal display device according to the embodiment of the disclosure, in order for the viewing angle compensation film to have the function of compensating the angle of view, the two negative biaxial films are disposed between the liquid crystal display element and the polarizer of the polarizing plate. Here, it is necessary to make the optical axes of the two negative biaxial films orthogonal to or parallel with each other, and it is necessary to make the optical axes orthogonal to or parallel with the light transmission axis of the polarizer.

Hence, in the liquid crystal display device 10 according to embodiment 1, when the liquid crystal display substrate 41 is set as a center, on the array substrate 11 side, there is disposed the first polarizing plate 39 including, in order from the array substrate 11 side: the two negative biaxial films 42 that is formed of the second negative biaxial film 44 and the first negative biaxial film 43; the polarizer 39b; and the protective film 39a made of TAC. Further, on the color filter substrate 26 side, there is disposed the second polarizing plate 40 including, in order from the color filter substrate 26 side: a protective film 40a that is made of TAC; the polarizer 40b; and a protective film 40c that is made of TAC.

Figure 5A:
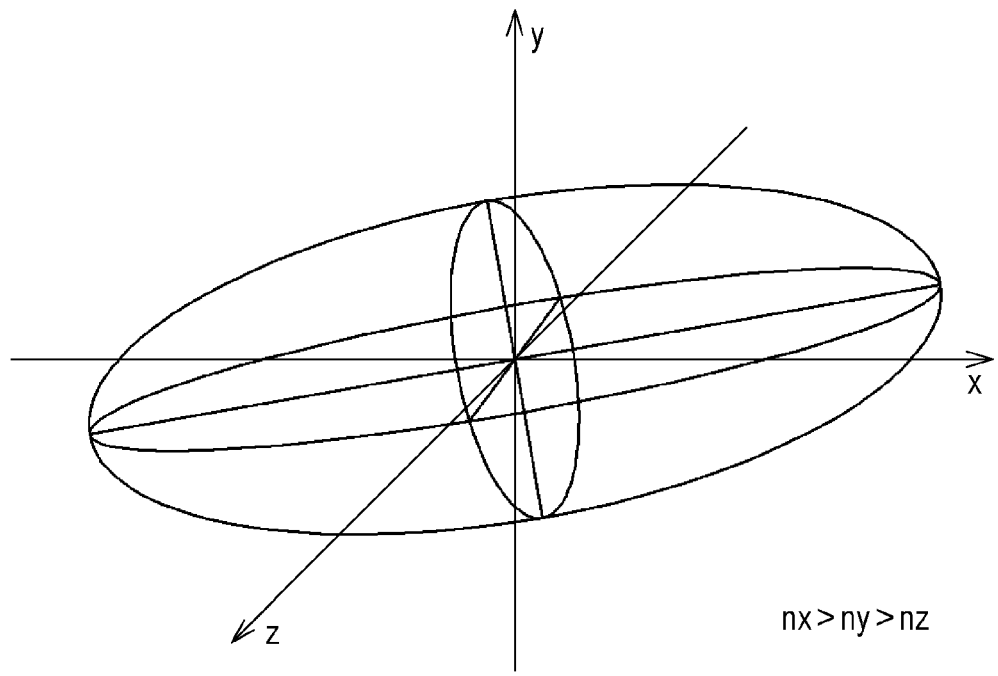
FIG. 5A is a schematic diagram illustrating a first film.

Furthermore, the biaxial film is defined as a film of which all the refractive indices in 3-axis directions of x, y and z are different from one another. Assuming that the refractive indices of the first negative biaxial film 43 in the 3-axis directions are respectively nx, ny, and nz, the first negative biaxial film 43 is a negative biaxial film which satisfies the following relationship (refer to FIG. 5A).

$$nx>ny>nz$$

Figure 5B:
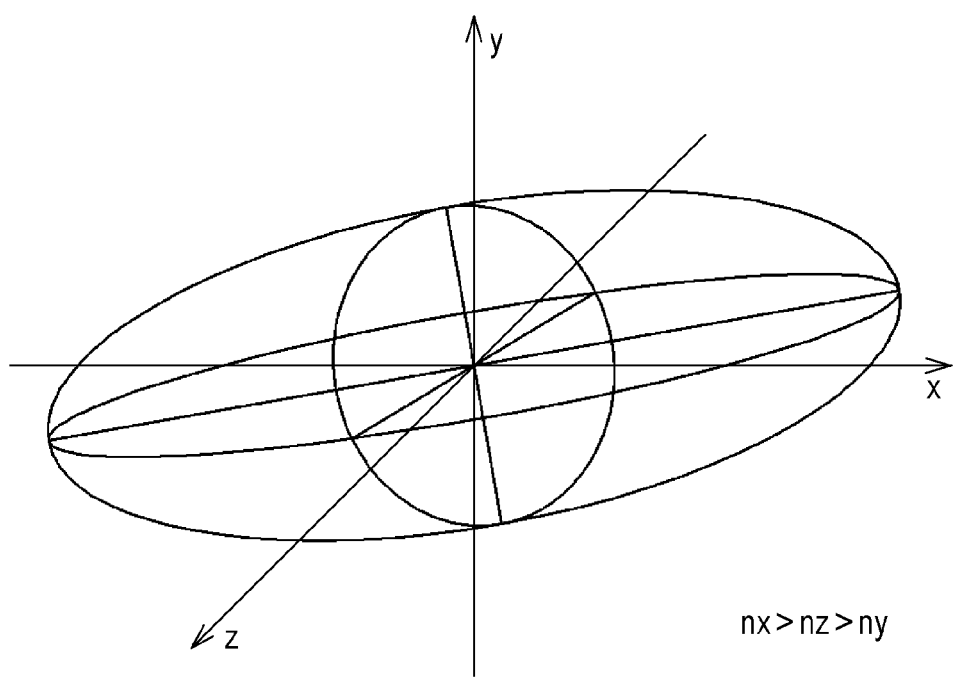
FIG. 5B is a schematic diagram illustrating a second film.

On the other hand, assuming that the refractive indices of the second negative biaxial film 44 in the 3-axis directions are respectively nx, ny, and nz, the second negative biaxial film 44 is a negative biaxial film which satisfies the following relationship (refer to FIG. 5B).

$$nx>nz>ny$$

As such a negative biaxial film, for example, a uniaxially stretched TAC or a uniaxially or biaxially stretched film such as polycarbonate and polynorbornene may be used. Hence, the negative biaxial film is used as the protective film of the polarizer similarly to the case of the polarizing plate in the related art. Further, the polarizer 39b of the first polarizing plate 39 and the polarizer 40b of the second polarizing plate 40 respectively have light transmission axes 39$_1$ and 40$_1$ which are orthogonal to each other. The first negative biaxial film 43 is disposed on the polarizer 39b side. Thus, the in-plane optical axis 44₁ of the second negative biaxial film 44 is parallel with the initial orientation direction of the liquid crystal layer 32 in the liquid crystal display substrate 41. In addition, the in-plane optical axis 43₁ of the first negative biaxial film 43 is parallel with or orthogonal to the initial orientation direction of the liquid crystal layer 32 (refer to FIG. 6).

With such a configuration, on the basis of the sum of the phase differences in all directions in the plane, it is possible to significantly improve characteristics of an angle of view in a diagonal direction in the transverse electric field type liquid crystal display device. Therefore, it is possible to obtain an angle of view at least equivalent to or better than that in the case of the above-mentioned transverse electric field type liquid crystal display device in the related art. In addition, the negative biaxial film is also used as the protective film of one of the polarizing plates. Hence, a separate protective film can be removed, and thus it is possible to avoid an increase in thickness of the polarizing plate caused by using the two negative biaxial films.

Embodiment 2

As a liquid crystal display device 10A according to embodiment 2, the following case will be described: two negative biaxial films 42A, which are provided on a second polarizing plate 40A, are disposed on the color filter substrate 26 side, a second negative biaxial film 44A is disposed on the liquid crystal display substrate 41 side, and a first negative biaxial film 43A is disposed on a polarizer 40Ab side of the second polarizing plate 40A. Furthermore, the liquid crystal display substrate 41 in the FFS-mode liquid crystal display device 10A according to embodiment 2 is common to that in the liquid crystal display device 10 according to embodiment 1. Further, the liquid crystal display device 10A according to embodiment 2 is different from the liquid crystal display device 10 according to embodiment 1 only in positions of the disposed first negative biaxial film and second negative biaxial film. Therefore, the elements with the same structure as embodiment 1 will be represented by the same reference numerals and signs, and a detailed description thereof will be omitted.

In the liquid crystal display device 10A according to embodiment 2, as shown in FIG. 7, when the liquid crystal display substrate 41 is set as a center, on the array substrate 11 side, there is disposed a first polarizing plate 39A including, in order from the array substrate 11 side: a protective film 39Ac; a polarizer 39Ab; and a protective film 39Aa. In addition, on the color filter substrate 26 side, there is disposed a second polarizing plate 40A including, in order from the color filter substrate 26 side: a second negative biaxial film 44A; a first negative biaxial film 43A; a polarizer 40Ab; and a protective film 40Aa.

Furthermore, in the liquid crystal display device 10A according to embodiment 2, the first negative biaxial film 43A is disposed on the polarizer 40Ab side. Thus, the optical axis 44A₁ of the second negative biaxial film 44A is parallel with the initial orientation direction of the liquid crystal layer 32 in the liquid crystal display substrate 41. In addition, the in-plane optical axis 43A₁ of the first negative biaxial film 43A is parallel with or orthogonal to the initial orientation direction of the liquid crystal layer 32 (refer to FIG. 8). With such a configuration, in the liquid crystal display device 10A according to embodiment 2, it is also possible to achieve an angle of view the same as that of the liquid crystal display device 10 according to embodiment 1.

Embodiment 3

As a liquid crystal display device 10B according to embodiment 3, the following case will be described: two negative biaxial films 42B, which are provided on a first polarizing plate 39B, are disposed on the array substrate 11 side, a first negative biaxial film 43B is disposed on the liquid crystal display substrate 41 side, and a second negative biaxial film 44B is disposed on a polarizer 39Bb side of the first polarizing plate 39B. Furthermore, the liquid crystal display substrate 41 in the FFS-mode liquid crystal display device 10B according to embodiment 3 is common to that in the liquid crystal display device 10 according to embodiment 1. Further, the liquid crystal display device 10B according to embodiment 3 is different from the liquid crystal display device 10 according to embodiment 1 only in positions of the disposed first negative biaxial film and second negative biaxial film. Therefore, the elements with the same structure as embodiment 1 will be represented by the same reference numerals and signs, and a detailed description thereof will be omitted.

Figure 9:
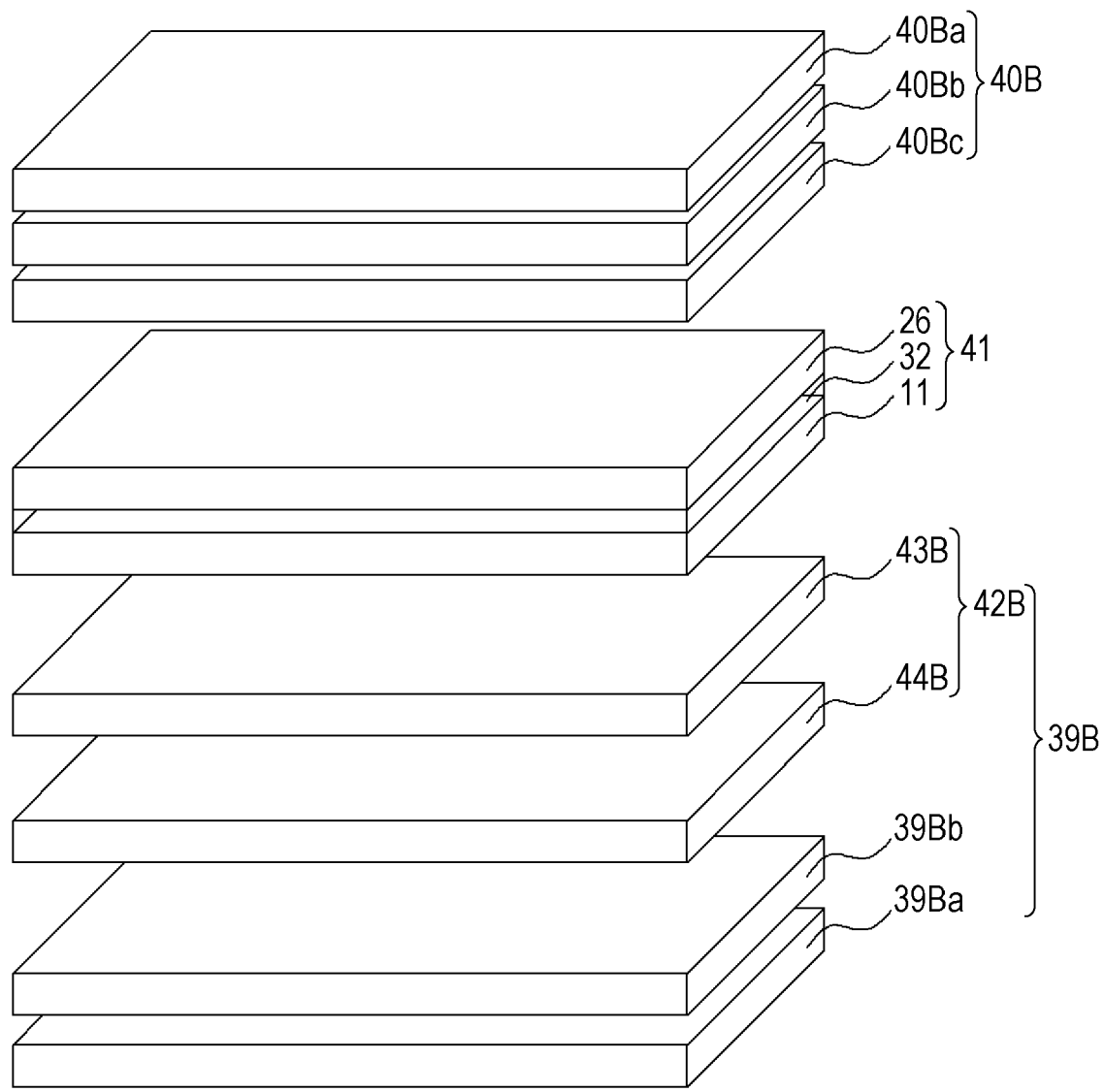
FIG. 9 is an exploded perspective view illustrating the liquid crystal display device according to embodiment 3.

In the liquid crystal display device 10B according to embodiment 3, as shown in FIG. 9, when the liquid crystal display substrate 41 is set as a center, on the array substrate 11 side, there is disposed a first polarizing plate 39B including, in order from the array substrate 11 side: a first negative biaxial film 43B, second negative biaxial film 44B; a polarizer 39Bb; and a protective film 39Ba. In addition, on the color filter substrate 26 side, there is disposed a second polarizing plate 40B including, in order from the color filter substrate 26 side: a protective film 40Bc; polarizer 40Bb; and a protective film 40Ba.

Figure 10:
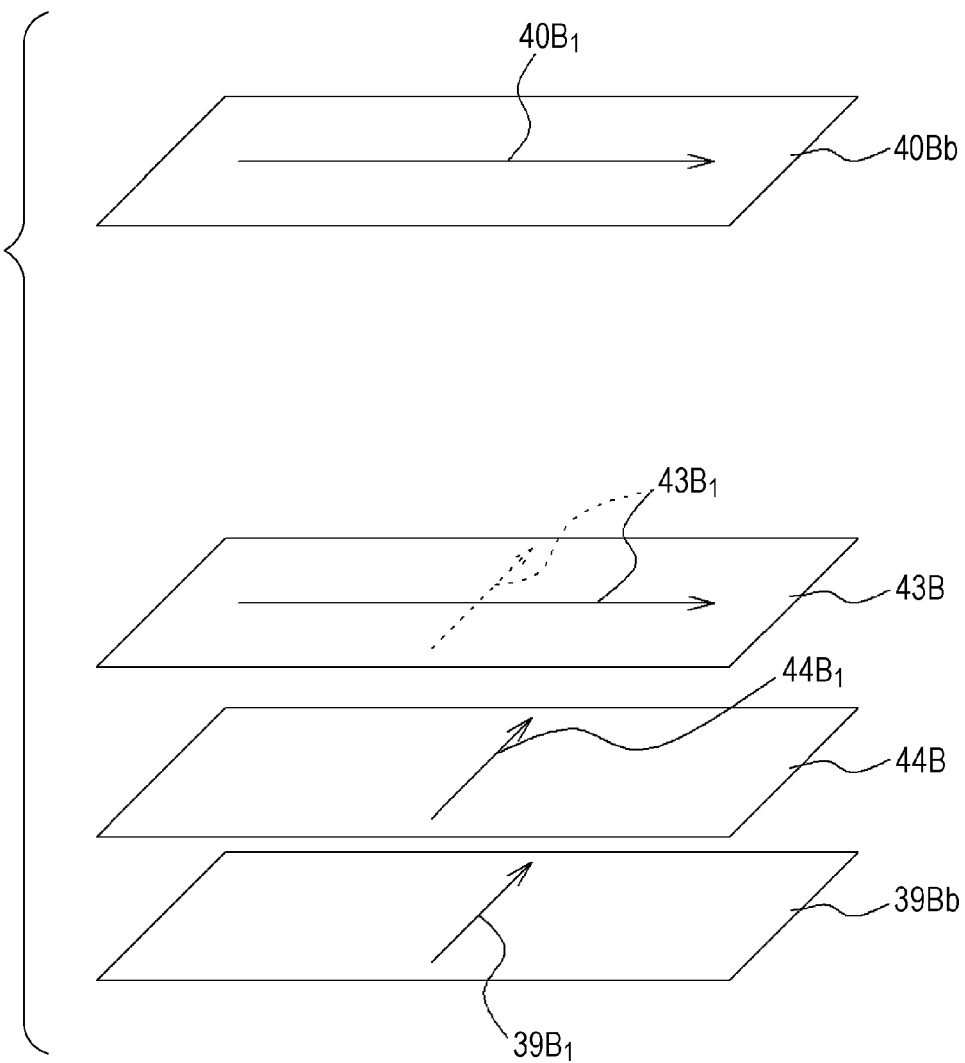
FIG. 10 is a schematic diagram illustrating an example of phases of respective layers according to embodiment 3.

Further, in the liquid crystal display device 10B according to embodiment 3, the second negative biaxial film 44B is disposed on the polarizer 39Bb side. In this case, the in-plane optical axis 44B₁ of the second negative biaxial film 44B is orthogonal to the initial orientation direction of the liquid crystal layer 32 in the liquid crystal display substrate 41. In addition, the in-plane optical axis 43B₁ of the first negative biaxial film 43B is parallel with or orthogonal to the initial orientation direction of the liquid crystal layer 32 (refer to FIG. 10). With such a configuration, in the liquid crystal display device 10B according to embodiment 3, it is also possible to achieve an angle of view the same as that of the liquid crystal display device 10 according to embodiment 1.

Embodiment 4

As a liquid crystal display device 10C according to embodiment 4, the following case will be described: negative biaxial films 42C, which are provided on a second polarizing plate 40C, are disposed on the color filter substrate 26 side, a first negative biaxial film 43C is disposed on the liquid crystal display substrate 41 side, and a second negative biaxial film 44C is disposed on a polarizer 40Cb side of the second polarizing plate 40C. Furthermore, the liquid crystal display substrate 41 in the FFS-mode liquid crystal display device 10C according to embodiment 4 is common to that in the liquid crystal display device 10 according to embodiment 1. Further, the liquid crystal display device 10C according to embodiment 4 is different from the liquid crystal display device 10 according to embodiment 1 only in positions of the disposed first negative biaxial film and second negative biaxial film. Therefore, the elements with the same structure as embodiment 1 will be represented by the same reference numerals and signs, and a detailed description thereof will be omitted.

Figure 11:
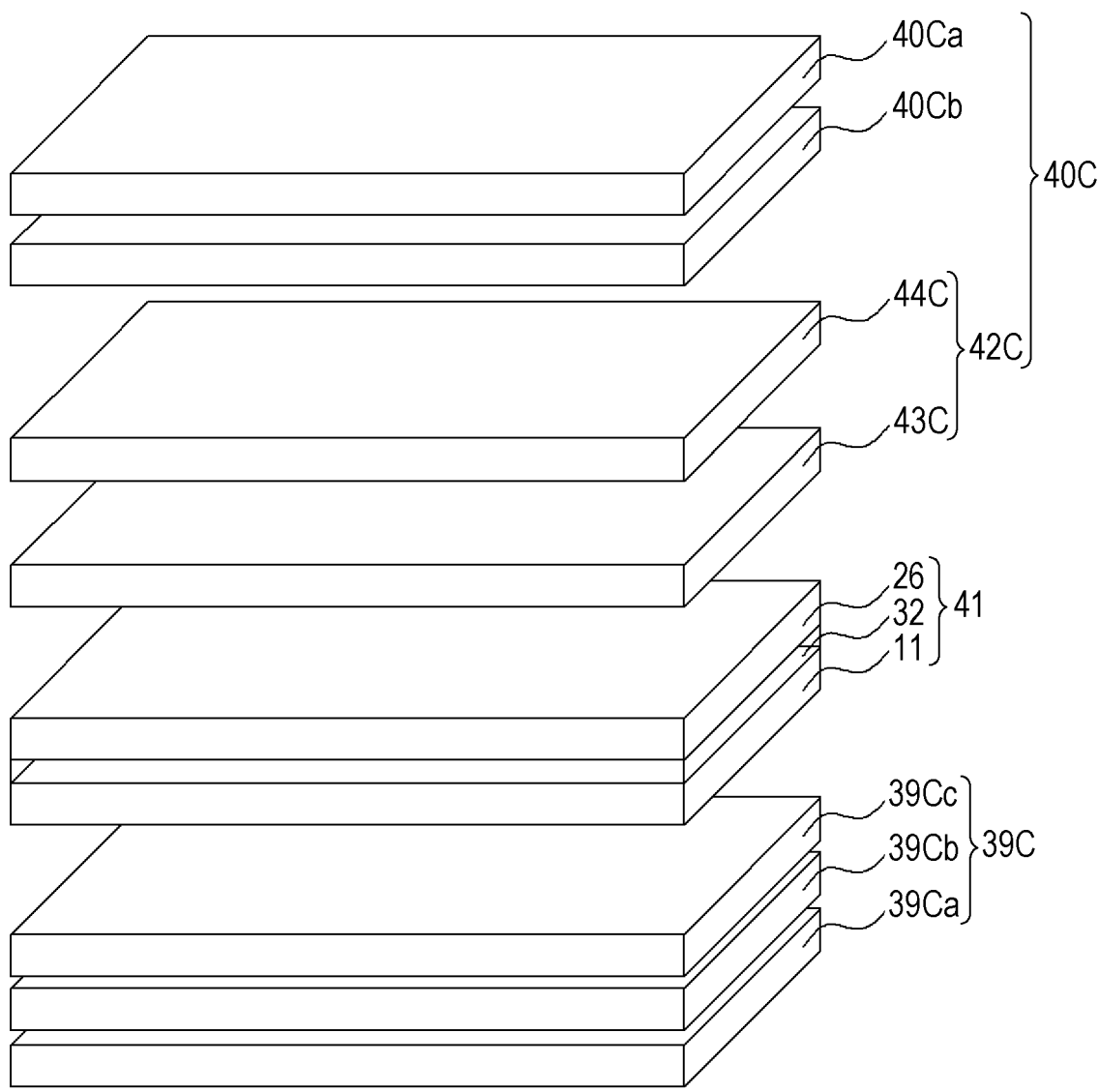
FIG. 11 is an exploded perspective view illustrating the liquid crystal display device according to embodiment 4.

In the liquid crystal display device 10C according to embodiment 4, as shown in FIG. 11, when the liquid crystal display substrate 41 is set as a center, on the color filter substrate 26 side, there is disposed a second polarizing plate 40C including, in order from the color filter substrate 26 side: a first negative biaxial film 43C; a second negative biaxial film 44C; a polarizer 40Cb; and a protective film 40Ca. In addition, on the array substrate 11 side, there is disposed a first polarizing plate 39C including, in order from the array substrate 11 side: a protective film 39Cc; a polarizer 39Cb; and a protective film 39Ca.

Further, in the liquid crystal display device 10C according to embodiment 4, the second negative biaxial film 44C is disposed on the polarizer 40Cb side. In this case, the in-plane optical axis $44C_1$ of the second negative biaxial film 44C is orthogonal to the initial orientation direction of the liquid crystal layer 32 in the liquid crystal display substrate 41. In addition, the in-plane optical axis $43C_1$ of the first negative biaxial film 43C is parallel with or orthogonal to the initial orientation direction of the liquid crystal layer 32 (refer to FIG. 12). With such a configuration, in the liquid crystal display device 10C according to embodiment 4, it is also possible to achieve an angle of view the same as that of the liquid crystal display device 10 according to embodiment 1.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A liquid crystal display device of a transverse electric field type, comprising:
    a pair of substrates;
    a liquid crystal layer sandwiched between the pair of substrates;
    a pair of polarizing plates provided on a side of the pair of substrates opposite to the liquid crystal layer such that the light transmission axes of the pair of polarizing plates are orthogonal to each other;
    a first electrode;
    a second electrode;
    wherein the first electrode and the second electrode are formed on a first substrate of the pair of substrates; the liquid crystal layer is driven by an electric field generated between the first electrode and the second electrode;
    one of the pair of polarizing plates, which is formed on the first substrate, is formed of a protective film, a polarizer, and two negative biaxial films; the two negative biaxial films include a first negative biaxial film and a second negative biaxial film; and the first negative biaxial film and the second negative biaxial film are overlapped and disposed on a side of the first substrate or a second substrate of the pair of substrates,
    wherein the first negative biaxial film satisfies a relationship of nx>ny>nz, and wherein nx, ny and nz represent refractive indices of the respective axis directions, d represents a thickness of a retardation plate, an in-plane phase difference Ro thereof is represented by 0 nm< (nx−ny)*d ≤20 nm, and a large-thickness-direction phase difference Rth thereof is represented by 50 nm ≤{(nx+ny)/2−nz}*d≤100 nm, and
    wherein the second negative biaxial film satisfies a relationship of nx>nz>ny, an in-plane phase difference Ro thereof is represented by 100 nm≤(nx−ny)*d≤200 nm, and a birefringence coefficient Nz thereof represented by (nx−nz)/(nx−ny) is in a range of 0 to 0.3.

2. The liquid crystal display device according to claim 1, wherein the first negative biaxial film is disposed on a side of a polarizer of the polarizing plate, an optical axis of the second negative biaxial film is set to be parallel with an initial orientation direction of the liquid crystal, and an optical axis of the first negative biaxial film is set to be parallel with or be orthogonal to the initial orientation direction of the liquid crystal.

3. The liquid crystal display device according to claim 1, wherein the second negative biaxial film is disposed on a side of a polarizer of the polarizing plate, an optical axis of the second negative biaxial film is set to be orthogonal to an initial orientation direction of the liquid crystal, and an optical axis of the first negative biaxial film is set to be parallel with or be orthogonal to the initial orientation direction of the liquid crystal.

4. The liquid crystal display device according to claim 1, wherein both the first negative biaxial film and the second negative biaxial film are formed of a stretched film such as triacetyl cellulose, polycarbonate, or polynorbornene.

* * * * *